Patented Mar. 2, 1926.

1,575,443

UNITED STATES PATENT OFFICE.

THOMAS MIDGLEY, JR., OF DAYTON, OHIO, ASSIGNOR, BY MESNE ASSIGNMENTS, TO GENERAL MOTORS CORPORATION, OF DETROIT, MICHIGAN, A CORPORATION OF DELAWARE.

METHOD AND MEANS FOR USING LOW-COMPRESSION FUELS.

No Drawing. Application filed September 18, 1923. Serial No. 663,501.

*To all whom it may concern:*

Be it known that I, THOMAS MIDGLEY, Jr., a citizen of the United States of America, residing at Dayton, county of Montgomery, and State of Ohio, have invented certain new and useful Improvements in Methods and Means for Using Low-Compression Fuels, of which the following is a full, clear, and exact description.

This invention relates to the art of suppressing a fuel knock when a combustible gaseous mixture containing a low compression fuel such, for example, as kerosene and gasoline is burned under a relatively high pressure. The principal objects of this invention are to employ titanium compounds to suppress the fuel knock.

Kerosene has a critical compression pressure of about 55 pounds. The critical compression pressure of gasoline varies from about 75 pounds for the commoner forms now marketed to about 125 pounds for "aviation gasoline" employed in airplane engines. These fuels are termed low compression fuels. When the vapors of any one of them is mixed with air, compressed to a compression pressure in excess of the normal critical compression pressure of the fuel, and burned, as in an internal combustion engine, a fuel knock is produced.

I have found that vapors of titanium compounds added to the fuel-air mixture suppress this fuel knock and permit an increase in the engine compression pressure with a normal burning characteristic of the fuel.

By way of an example of one method of carrying out my invention, I dissolve 1000 c. c. of titanium tetrachloride $TiCl_4$ in 1 gallon of gasoline comprising a saturated hydrocarbon having a normal critical compression pressure of about 75 pounds. This compound is relatively unstable in unsaturated hydrocarbon fuels. This solution or high compression fuel is fed through a carburetor into the cylinder of an internal combustion engine having a compression pressure of about 100 pounds, the solution being vaporized and mixed with air as is common practice in engine operation. The gaseous high compression fuel is ignited and the engine operated without a fuel knock. The gasoline forms the fuel base and the titanium compound increases the critical compression pressure of this base.

This process may be varied by changing the proportions according to the increase in critical compression pressure desired and by using other titanium compounds in place of the tetrachloride.

I prefer to employ the titanium compounds which are soluble in the fuel to promote the mixing of the two. Blending agents may be employed if the titanium compound does not dissolve readily in the fuel. The compound may be added to the fuel-air mixture just before the latter is burned.

I claim:

1. A composition of matter comprising a low compression fuel; and a volatile titanium compound incorporated therein and adapted to increase the critical compression pressure of the fuel.

2. A composition of matter comprising a low compression fuel; and titanium tetrachloride.

3. A composition of matter comprising gasoline and titanium tetrachloride.

In testimony whereof I hereto affix my signature.

THOMAS MIDGLEY, JR.